United States Patent
Norimatsu et al.

(10) Patent No.: US 6,880,395 B2
(45) Date of Patent: Apr. 19, 2005

(54) TIRE INTERNAL PRESSURE MONITOR SYSTEM AND ID CODE REGISTERING METHOD IN THE SAME

(75) Inventors: Hideaki Norimatsu, Toyohashi (JP); Nobuya Watabe, Nagoya (JP)

(73) Assignee: Denso Corporation, Kariya (JP)

( * ) Notice: Subject to any disclaimer, the term of this patent is extended or adjusted under 35 U.S.C. 154(b) by 74 days.

(21) Appl. No.: 10/635,495

(22) Filed: Aug. 7, 2003

(65) Prior Publication Data

US 2004/0031317 A1 Feb. 19, 2004

(30) Foreign Application Priority Data

Aug. 19, 2002 (JP) ........................................ 2002-238162

(51) Int. Cl.[7] .............................................. B60C 23/02
(52) U.S. Cl. ........................ 73/146.4; 73/146; 340/442
(58) Field of Search ............................... 73/146–146.8; 340/440–447

(56) References Cited

U.S. PATENT DOCUMENTS

| 5,109,213 A | * | 4/1992 | Williams ..................... 340/447 |
| 5,602,524 A | | 2/1997 | Mock et al. |
| 5,612,671 A | * | 3/1997 | Mendez et al. .............. 340/447 |
| 6,259,361 B1 | * | 7/2001 | Robillard et al. ............ 340/447 |
| 6,278,363 B1 | * | 8/2001 | Bezek et al. ................. 340/442 |
| 6,417,766 B1 | * | 7/2002 | Starkey ....................... 340/447 |
| 6,453,737 B1 | * | 9/2002 | Young et al. ............... 73/146.5 |

FOREIGN PATENT DOCUMENTS

| JP | A-07-81338 | 3/1995 |
| JP | A-07-197711 | 8/1995 |

* cited by examiner

Primary Examiner—Edward Lefkowitz
Assistant Examiner—Jermaine Jenkins
(74) Attorney, Agent, or Firm—Posz Law Group, PLC

(57) ABSTRACT

A tire internal pressure monitor ECU is switched between a monitoring mode where internal pressures of tires of a vehicle are monitored, and a registering mode where ID codes assigned to sensor units provided in the tires are registered. In the registering mode, when receiving the ID code from the sensor unit, the ECU registers the ID code along with instructing an auxiliary device to operate a predetermined conduct that can be seen from an outside of the vehicle. Namely, the predetermined conduct of the auxiliary device notifies completion of registering the ID code, which results in enhancing operation efficiency in registering of the ID code.

12 Claims, 3 Drawing Sheets

TIRE INTERNAL PRESSURE MONITOR SYSTEM AND ID CODE REGISTERING METHOD IN THE SAME

CROSS REFERENCE TO RELATED APPLICATIONS

This application is based on and incorporates herein by reference Japanese Patent Application No. 2002-238162 filed on Aug. 19, 2002.

FIELD OF THE INVENTION

The present invention relates to a vehicular tire internal pressure monitor system and an identification registering method in the same. Here, identification codes (ID code) of sensor units disposed in tires are registered to a monitor unit.

BACKGROUND OF THE INVENTION

Monitor systems are proposed for internal pressure of tires provided in a vehicle. One monitor system includes a sensor unit disposed in each tire and a monitor unit disposed in a vehicle body. The sensor unit has a sensor for detecting internal pressure of each tire and a transmitter for sending the detected internal pressure. The monitor unit receives the detected internal pressure from the transmitter of the sensor unit to give warning when the detected internal pressure is smaller than a predetermined value.

Here, a unique identification code (ID code) is assigned to the sensor unit and registered in the monitor unit. The unique ID code accompanies the detected internal pressure that is sent to the monitor unit, so that the monitor unit can determine whether the received internal pressure is sent from its own sensor unit. When the ID code of the sensor unit is successfully verified, the monitor unit then determines whether the received internal pressure is adequate. Using the ID code assigned to each sensor unit gives reliability to the monitor system.

Here, the ID code of the sensor unit provided in each tire is registered to the monitor unit as follows. Through a predetermined switching manipulation the monitor unit is shifted from a monitoring mode (normal mode) to a registering mode. For instance, decompressing an internal pressure of a tire forcibly causes a corresponding sensor unit to send a signal with the ID code. When the monitor unit is in the registering mode, the received ID code of the sensor unit is registered in the monitor unit.

However, in a conventional tire pressure monitor system, switching into the registering mode or completion of registering the ID code is shown in a display such as an LED (light emitting diode) that is located inside a cabin of the vehicle. When an operator registering the ID code forcibly sends the ID code from the sensor unit of the tire, he must confirm, through observing the display inside the cabin of the vehicle, whether the ID code is surely registered in the monitor unit. Necessity of repeatedly observing the display inside the cabin decreases operation efficiency in registering the ID code.

SUMMARY OF THE INVENTION

It is an object of the present invention to provide an identification code registering method having high operation efficiency in a vehicular tire internal pressure monitor system.

To achieve the above object, a tire internal pressure monitor system provided with the following. A sensor unit of a tire sends a detected internal pressure of the tire and its own ID code to a monitor unit. When receiving the ID code in a registering mode, the monitor unit stores in a memory the ID code to register the ID code. The monitor unit then notifies completion of registering the ID code by making an auxiliary device operate a conduct that can be recognized from an outside of the vehicle. This structure enables an operator registering the ID code outside the vehicle to easily recognize the procedure of registering the ID code. This results in enhancing operation efficiency in registering the ID codes of the sensor units disposed in the tires.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

A tire internal pressure monitor system as an embodiment of the present invention is directed to a four-wheel passenger vehicle. It can be also directed to a truck or a bus.

Figure 1:
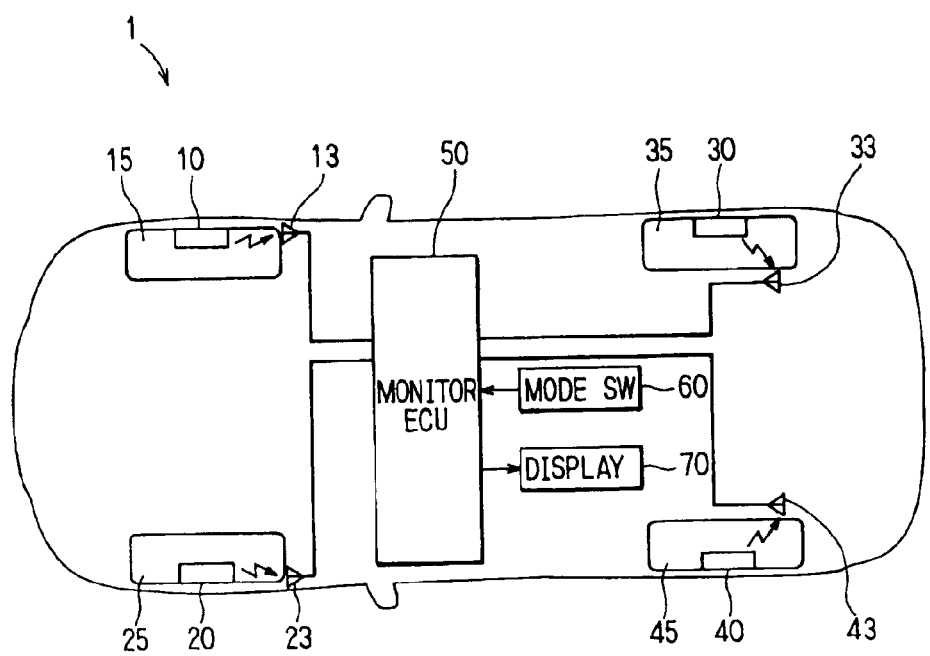
FIG. 1 is a schematic diagram showing structure of a tire internal pressure monitor system according to an embodiment of the present invention.
Figure 2:
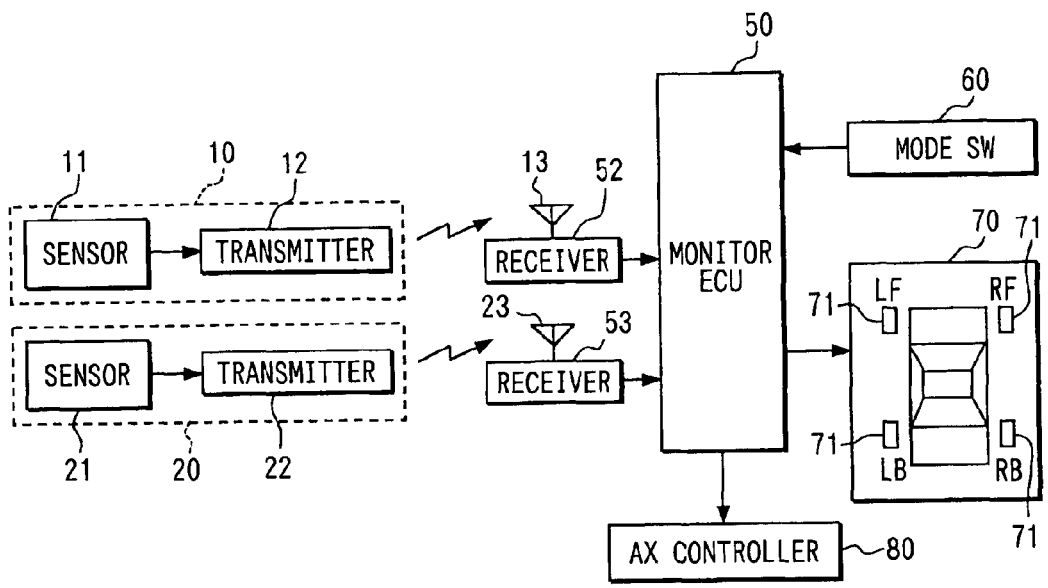
FIG. 2 is a functional block diagram of the tire internal pressure monitor system.

As shown in FIGS. 1, 2, a tire internal pressure monitor system 1 includes four sensor units 10, 20, 30, 40, disposed in four tires 15, 25, 35, 45 that are located backwards-forwards, and rightwards-leftwards of a vehicle. Each sensor unit 10, 20, 30, 40 includes an internal pressure sensor 11, 21, 31, 41 and a transmitter 12, 22, 32, 42. The internal pressure sensor 11, 21, 31, 41 detects an internal pressure of the tire 15, 25, 35, 45. The transmitter 12, 22, 32, 42 sends by radio wave a signal including a detected internal pressure value and an identification (ID) code uniquely assigned to each sensor unit 10, 20, 30, 40. Each sensor unit 10, 20, 30, 40 is integrally constructed in a tire valve to be attached in a tire disk wheel. The sensor unit 10, 20, 30, 40 can also include a thermal sensor that detects a temperature of the tire 15, 25, 35, 45, so that pressure change due to thermal change can be considered.

Each receiving antenna 13, 23, 33, 43 disposed in each wheel house receives the signal from each transmitter 12, 22, 32, 42 to send the received signal to a corresponding receiver 52, 53 for signal processing such as amplification of the received signal. The received signal is then sent to an internal pressure monitor electronic control unit (monitor ECU) 50. The monitor ECU 50 determines an internal pressure state of each tire 15, 25, 35, 45 based on the detected internal pressure included in the received signal. In detail, the receivers 52, 53 are not shown in FIG. 1 for simplifying.

Here, the four receiving antennas 13, 23, 33, 43 and the two receivers 52, 53 are disposed for the four sensor units 10, 20, 30, 40. However, a common receiving antenna and a common receiver can receive signals from the respective sensor units 10, 20, 30, 40.

The internal pressure state of each tire 15, 25, 35, 45 determined by the monitor ECU 50 is shown in a display 70 of an instrument panel inside a cabin of the vehicle. The display includes indicators 71 that are formed of LEDs (light-emitting diodes) corresponding to the respective positions of the tires 15, 25, 35, 45, as shown in FIG. 2. When an internal pressure of a certain tire is determined to be lower than a predetermined value, the indicator 71 corresponding to the position of the certain tire is lighted to notify the tire's internal pressure decrease to a driver.

Here, although the four indicators 71 are provided for the respective positions of the tires 15, 25, 35, 45, a single indicator (or warning lamp) can be provided for notifying the pressure decrease of any tire 15, 25, 35, 45. The display 70 can be a display where the detected pressure values are directly shown.

The monitor system further includes a mode switch (SW) 60. The mode switch 60 switches an operating mode of the monitor ECU 50 between a monitoring mode and a registering mode. In the monitoring mode, the monitor ECU 50 monitors internal pressure states of the tires 15, 25, 35, 45. In the registering mode, the monitor ECU 50 registers the ID codes uniquely assigned to the respective sensor units 10, 20, 30, 40.

The monitor ECU 50 is connected with an auxiliary (AX) controller 80 that controls operating states of auxiliary devices. The auxiliary devices include a headlamp, a blinker, a front wiper, and a rear wiper, whose operating states can be seen from an outside of the cabin of the vehicle, and others (such as a brake lamp and a horn). The auxiliary controller 80 controls, based on an instruction of the monitor ECU 50, the auxiliary devices for operating in a predetermined state.

Figure 3:
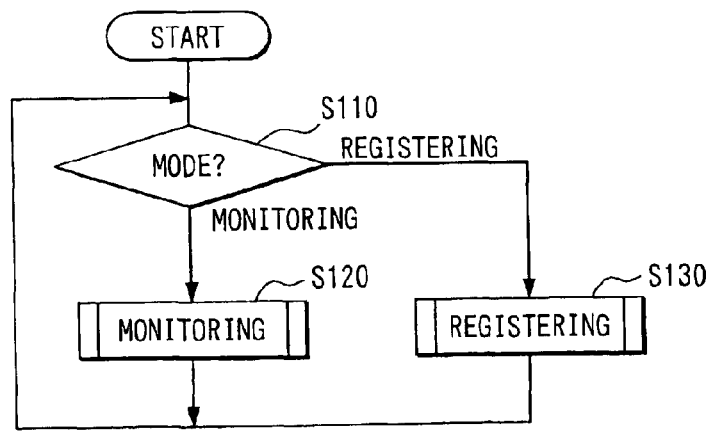
FIG. 3 is a flow chart explaining processing executed by an internal pressure monitor ECU.
Figure 4:
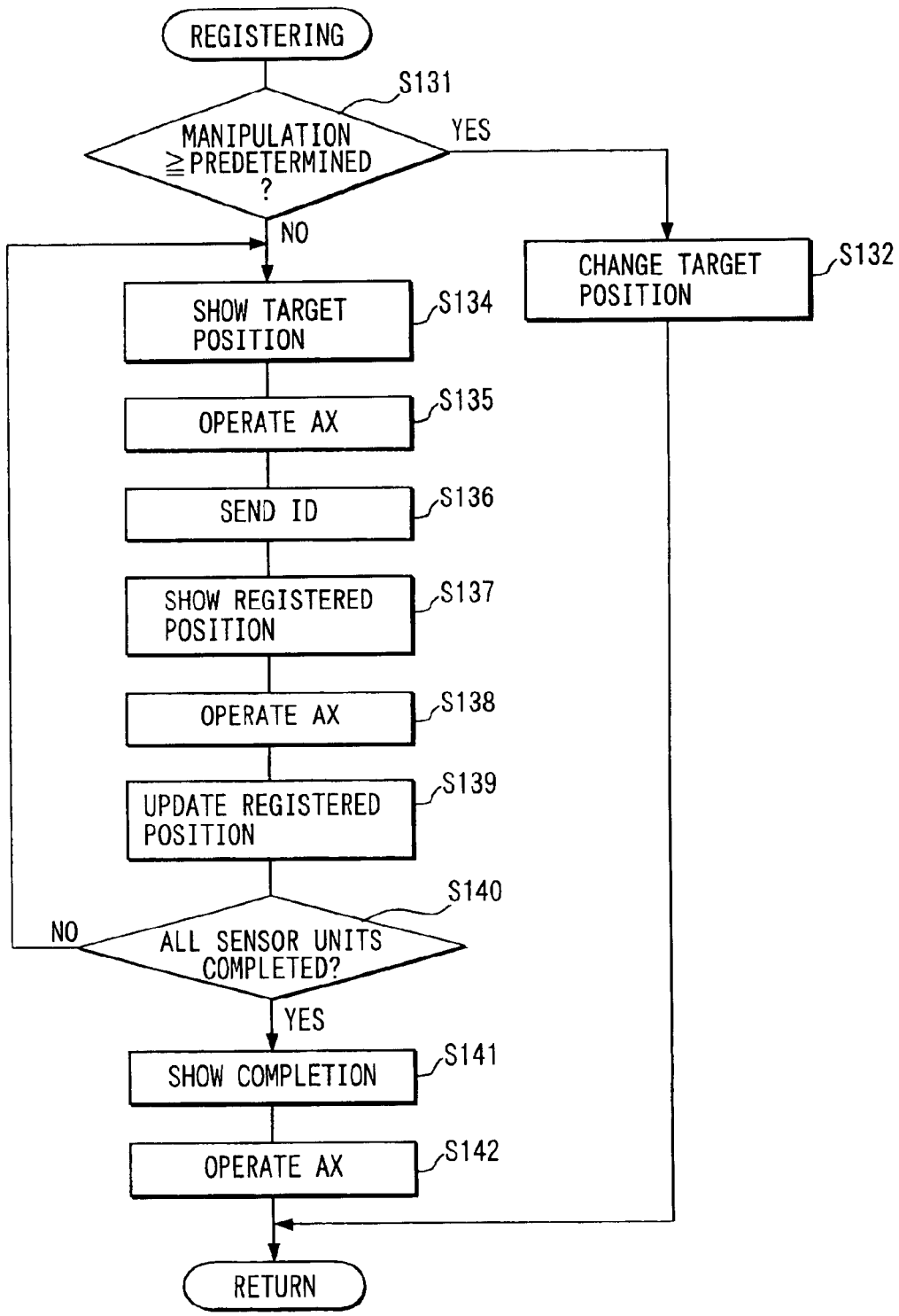
FIG. 4 is a flow chart explaining processing of a registering routine.

Processing executed in the monitor system 1 will be explained with reference to FIGS. 3, 4.

At Step 110, an operating mode of the monitor ECU 50 is determined. For instance, when the mode switch 60 is formed of a push switch, by being pushed down, the monitor ECU 50 is switched into the registering mode. When the operating mode is determined to be monitoring mode, the processing proceeds to Step 120.

At Step 120, a known monitoring routine takes place. Each sensor unit 11, 21, 31, 41 detects an internal pressure of the corresponding tire 15, 25, 35, 45. Each transmitter 12, 22, 32, 42 sends a transmission signal including the detected internal pressure value and the ID code of the corresponding sensor unit 10, 20, 30, 40 for a predetermined interval. When receiving the transmission signal via the corresponding receiving antenna 13, 23, 33, 43 and the corresponding receiver 52, 53, the monitor ECU 50 at first collates the received ID code with the ID code that is previously registered to determine whether a predetermined relation suffices. When the transmission signal is determined to be from the sensor units 10, 20, 30, 40 that are disposed in the own vehicle, the monitor ECU 50 then determines whether the detected internal pressure value included in the transmission signal is adequate. Using the ID code assigned to each sensor unit 10, 20, 30, 40 prevents an error of mistaking signals from other vehicles for the proper signals within the own vehicle. This results in enhancing reliability in monitoring of the tire internal pressure.

Furthermore, the ID code assigned to each sensor unit 10, 20, 30, 40 is registered with being correlated with the position of the corresponding tire 15, 25, 35, 45. When the detected internal pressure value is determined to be lower than the predetermined value, the monitor ECU 50 designates the position of the corresponding tire to light up the corresponding indicator 71. This enables the driver to immediately know which tire among the four tires is under the inadequate internal pressure.

By contrast, when the operating mode is determined to be registering mode at Step 110, the processing proceeds to Step 130. Here, an ID code registering routine takes place. Processing of the ID code registering routine will be explained with reference to FIG. 4. This routine is executed to register, to the monitor ECU 50, the ID code assigned to each sensor unit 10, 20, 30, 40 in cases where the vehicle is shipped out from a manufacturing factory or a tire of the vehicle is changed.

At Step 131, it is determined whether a manipulation time of the mode switch 60 is not less than a predetermined period. When the manipulation time is determined to be not less than the predetermined period, the processing proceeds to Step 132.

At Step 132, a registration change procedure of a target mounting position of a tire 15, 25, 35, 45 corresponding to a sensor unit 10, 20, 30, 40 is executed as follows. The target mounting position is a mounting position where the tire 15, 25, 35, 45 corresponding to the sensor unit 10, 20, 30, 40 is going to be mounted. Namely, the target mounting position is going to be registered as a registered mounting position after the registration is completed. It is previously set that a target mounting position of a tire 15, 25, 35, 45 having a sensor unit 10, 20, 30, 40 is changed in a predetermined order, e.g., left-forward→right-forward→right-backward→left-forward, each time one registration is completed. Therefore, when the registration change procedure is not executed, the left-forward position is at first regarded as a target mounting position. The target mounting position is indicated by blinking the corresponding indicator 71 of the display 70, so that the indicator corresponding to the left-forward position is blinked.

Here, the target mounting position can be changed, through a manipulation of the mode switch 60, from the left-forward position to another. When the target mounting position is changed through the manipulation of the mode switch 60, an indicator 71 corresponding to the changed target mounting position is blinked and the changed target mounting position is stored in an inside memory. In detail, at Step 131, each time the mode switch 60 is pushed down, the target mounting position is changed in the above predetermined order. Each time the preceding target mounting position is changed to the subsequent one, a blinked indicator 71 is changed from the preceding mounting position to the subsequent one. Namely, at Step 132, when at least one tire 15, 25, 35, 45 is going to be mounted to a new mounting position, a target mounting position is selected through the registration change procedure. The ID code of the corresponding sensor unit 10, 20, 30, 40 can be properly registered with the new mounting position.

Here, although the mode switch 60 is used for the registration change procedure, any other switches can be substituted for the mode switch 60. When the registration change procedure is completed, the ID code registering routine is once terminated.

At Step 131, when the manipulation time is determined to be less than the predetermined period, the processing proceeds to Step 134.

At Step 134, similarly with the processing at Step 132, an indicator 71 of a target mounting position for a sensor unit 10, 20, 30, 40 is blinked. Here, when the target mounting position corresponding to the sensor unit 10, 20, 30, 40 is changed at Step 132 and stored in the inside memory, an indicator 71 of the changed mounting position is blinked. By contrast, when the target mounting position corresponding to the sensor unit 10, 20, 30, 40 is not changed, indicators 71 are blinked in the above predetermined order.

At Step 135, an auxiliary (AX) device is operated so that an operator, outside the vehicle, registering the ID code of the sensor unit 10, 20, 30, 40, can recognize a target mounting position by an operating state of the auxiliary device. For instance, difference between a left wheel and a right wheel is recognized by blinking left or right winker. Difference between a forward wheel and a backward wheel is recognized by operating a forward wiper or a backward wiper. When an ID code of a sensor unit 20 that is disposed in a tire 25 located in a left-forward wheel is registered, the left winker is blinked and the front wiper is operated. Operating the auxiliary device according to the target mounting position thus enables the operator to recognize the target mounting position for the sensor unit 10, 20, 30, 40, even outside the vehicle, before completion of registration. This prevents registration to a wrong mounting position, which results in enhancing operation efficiency.

Distinction between the forward and backward positions can be done by a headlamp or a brake lamp. When winkers are disposed in the respective corners of the vehicle, each of the four positions can be recognized by blinking each of the winkers. Furthermore, blinking times of a hazard lamp can correspond to the mounting position. A horn can be sounded as a alarm when the lamps or the wipers are operated. Namely, establishing one-to-one correspondence between a mounting position and an operating state of an auxiliary device enables the operator outside of the vehicle to recognize a mounting position corresponding to a sensor unit 10, 20, 30, 40.

In the next place, at Step 136, a signal including the ID code of the sensor 10, 20, 30, 40 is sent through a predetermined operation to the corresponding sensor unit 10, 20, 30, 40. In detail, the predetermined operation includes rapid varying of a tire internal pressure that the corresponding sensor unit 10, 20, 30, 40 detects, or sending a trigger signal to the corresponding sensor unit 10, 20, 30, 40 by radio wave.

Receiving the signal including the ID code in the registering mode, the monitor ECU 50 stores, in the inside memory, the received ID code with correlating it with a mounting position to register the ID code. Executing the predetermined operation causes the corresponding sensor unit 10, 20, 30, 40 to send its ID code. This enables the monitor ECU 50 to successfully register the ID code of the sensor unit 10, 20, 30, 40 with being adequately correlated with the mounting position for the corresponding tire 15, 25, 35, 45.

At Step 137, completion of registering the ID code of the sensor unit 10, 20, 30, 40 is shown and notified in the display 70 through lighting up for a predetermined period an indicator 71 corresponding to the registered mounting position.

At Step 138, similarly to the processing at Step 135, an auxiliary (AX) device is operated according to the registered mounting position of the sensor unit 10, 20, 30, 40. This enables the operator to recognize, even outside the vehicle, that the ID code of the sensor unit 10, 20, 30, 40 is registered with being correlated with the mounting position of the corresponding tire 15, 25, 35, 45. Operation efficiency is thereby enhanced.

As explained above, the monitor ECU 50 stores the ID code assigned to the sensor unit 10, 20, 30, 40 with correlating it with the mounting position of the corresponding tire 15, 25, 35, 45. When an abnormality in an internal pressure occurs, the monitor ECU 50 can quickly designate the tire which has the abnormality.

At Step 139, the mounting position for the tire 15, 25, 35, 45 corresponding to the sensor unit 10, 20, 30, 40 is updated as a registered mounting position. Updating the mounting position each time the registering is completed more enhances operation efficiency in registering the ID code.

At Step 140, it is determined whether registration of all the ID codes of the sensor units 10, 20, 30, 40 is completed. When the registration of all the ID codes is not completed, the processing returns to Step 134 to repeat the processing at Steps 134 to 139. When the registration is completed, the processing proceeds to Step 141. For instance, in substituting only a certain tire, when an ID code of a sensor unit of the certain tire is registered, all the sensor units 10, 20, 30, 40 are determined to be entirely registered since the other three sensor units are previously registered.

Furthermore, at Step 140, a determination processing can be added for determining whether an elapsed time from the start of the registering mode is longer than a predetermined time (e.g., one hour). This prevents the registering operation from continuing with being interrupted due to some kind of reason even though the monitor ECU 50 remains in the registering mode. When the elapsed time exceeds the predetermined time, the registering routine shown in FIG. 4 is terminated without executing processing at Steps 141, 142.

At Step 141, completion of the registration of all the ID codes of the sensor units 10, 20, 30, 40 is shown and notified in the display 70 through, e.g., lighting up for a predetermined period indicators 71 corresponding to all the registered mounting positions.

At Step 142, auxiliary (AX) devices are operated as showing, to the outside of the vehicle, that all the sensor units are entirely registered. This enables the operator to easily recognize, even outside the vehicle, that the ID codes of the sensor units 10, 20, 30, 40 are entirely registered.

Furthermore, a sensor unit and its ID code can be also provided in a spare tire. Auxiliary devices' operating states showing that the registration of all the sensor units 10, 20, 30, 40 is completed can be the following states. The hazard lamp is blinked. All the lights are lighted up for a predetermined period. The front or rear wiper is operated for predetermined times. Other states can be adopted.

It will be obvious to those skilled in the art that various changes may be made in the above-described embodiments of the present invention. However, the scope of the present invention should be determined by the following claims.

What is claimed is:

1. A tire internal pressure monitor system provided in a vehicle, comprising:

a plurality of sensor units, each of which is disposed in a tire of the vehicle, detects an internal pressure of the tire, and sends a transmission signal including a detected internal pressure value and an identification code; and a monitor unit that receives the transmission signal to monitor a state of the internal pressure of the tire based on the received detected internal pressure value and the identification code, wherein the monitor unit is either in a monitoring mode where the state of the internal pressure is monitored or in a registering mode where the identification code is registered, wherein, when the monitor unit receives the identification code in the registering mode, the monitor unit stores in a memory the identification code to register the identification code, and wherein the monitor unit includes notifying means that notifies, when the monitor unit registers the identification code, completion of registering the identification code by causing the vehicle to perform an operation that is visible from an outside of the vehicle.

2. The tire internal pressure monitor system according to claim 1, wherein, when the monitor unit registers the identification code of the sensor unit, the monitor unit stores the identification code along with correlating the identification code with a position where the tire having the sensor unit is disposed, and wherein the notifying means changes the performed operation based on the position with which the identification code is correlated.

3. The tire internal pressure monitor system according to claim 1, wherein, when registering the identification codes of the sensor units disposed in all the tires that are disposed in the vehicle is completed, the notifying means caused the vehicle to perform the operation as showing that registering the identification codes of the sensor units disposed in all the tires that are disposed in the vehicle is completed.

4. The tire internal pressure monitor system according to claim 1, wherein the monitor unit previously sets an order of registering the identification codes of the sensor units disposed in all the tires that are disposed in the vehicle, along with correlating the identification codes with positions where the tires having the sensor units are disposed, respectively, and wherein, each time registering of each of the identification codes is completed, each of the positions where the tires having the sensor units are disposed is updated, according to the order of registering the identification codes.

5. The tire internal pressure monitor system according to claim 4, wherein the notifying means notifies the position where the tire having the sensor unit is disposed by causing an auxiliary device of the vehicle to operate based on the position.

6. The tire internal pressure monitor system according to claim 1, wherein, when a predetermined trigger is applied to the sensor unit, the sensor unit sends the identification code to the monitor unit.

7. An identification registering method in a tire internal pressure monitor system provided in a vehicle, the internal pressure monitor system that includes:

a plurality of sensor units, each of which is disposed in a tire of the vehicle, detects an internal pressure of the tire, and sends a transmission signal including a detected internal pressure value and an identification code; and a monitor unit that receives the transmission signal to monitor a state of the internal pressure of the tire based on the received detected internal pressure value and the identification code, the identification registering method comprising:

a step of switching the monitor unit from a monitoring mode where the state of the internal pressure is monitored to a registering mode where the identification code is registered;

a step of making the sensor unit send the identification code;

a step of registering, when the monitor unit receives the identification code, the received identification code by storing the identification code in a memory of the monitor unit; and a step of notifying, when the identification code is registered, completion of registering the identification code by causing the vehicle to perform an operation that is visible from an outside of the vehicle.

8. The identification registering method in the tire internal pressure monitor system, according to claim 7, wherein, at the step of registering the identification code of the sensor unit, the identification code is stored along with being correlating with a position where the tire having the sensor unit is disposed, and wherein, at the step of notifying completion of registering the identification code, the performed operation is changed based on the position with which the identification code is correlated.

9. The identification registering method in the tire internal pressure monitor system, according to claim 7, wherein, at the step of notifying completion of registering the identification code, when registering the identification codes of the sensor units disposed in all the tires that are disposed in the vehicle is completed, the vehicle is caused to perform the operation as showing that registering the identification codes of the sensor units disposed in all the tires that are disposed in the vehicle is completed.

10. The identification registering method in the tire internal pressure monitor system, according to claim 7, wherein, at the step of registering the identification code, an order is previously set for registering the identification codes of the sensor units, which are disposed in all the tires disposed in the vehicle, along with respectively correlating the identification codes with positions where the tires having the sensor units are disposed, and wherein, each time registering of each of the identification codes is completed, each of the positions where the tires having the sensor units are disposed is updated, according to the order of registering the identification codes.

11. The identification registering method in the tire internal pressure monitor system, according to claim 10, wherein, at the step of notifying completion of registering the identification code, the position where the tire having the sensor unit is disposed is notified by causing an auxiliary device operate of the vehicle based on the position.

12. The identification registering method in the tire internal pressure monitor system, according to claim 7, wherein, at the step of making the sensor unit send the identification code, when a predetermined trigger is applied to the sensor unit, the sensor unit sends the identification code to the monitor unit.

* * * * *